(12) United States Patent
Mazzaro et al.

(10) Patent No.: US 11,293,135 B2
(45) Date of Patent: Apr. 5, 2022

(54) SEAL FOR A DRYER

(71) Applicant: INDUSTRIE ILPEA S.P.A., Malgesso (IT)

(72) Inventors: Sandro Mazzaro, San Vito al Tagliamento (IT); Paolo Cittadini, Luvinate (IT)

(73) Assignee: INDUSTRIE ILPEA S.P.A., Malgesso (IT)

( * ) Notice: Subject to any disclaimer, the term of this patent is extended or adjusted under 35 U.S.C. 154(b) by 230 days.

(21) Appl. No.: 16/685,213

(22) Filed: Nov. 15, 2019

(65) Prior Publication Data

US 2020/0158241 A1 May 21, 2020

(30) Foreign Application Priority Data

Nov. 15, 2018 (IT) .......................... 102018000010346

(51) Int. Cl.
*D06F 58/04* (2006.01)
*F16J 15/02* (2006.01)
*F16J 15/3284* (2016.01)
*F16J 15/06* (2006.01)

(52) U.S. Cl.
CPC ............ *D06F 58/04* (2013.01); *F16J 15/022* (2013.01); *F16J 15/3284* (2013.01); *F16J 15/065* (2013.01)

(58) Field of Classification Search
CPC ........ D06F 58/04; F16J 15/022; F16J 15/027; F16J 15/065; F16J 15/32; F16J 15/3284
See application file for complete search history.

(56) References Cited

U.S. PATENT DOCUMENTS

| 3,637,224 | A | * | 1/1972 | Triplett | D06F 58/04 277/404 |
| 3,828,445 | A | * | 8/1974 | Smoot | D06F 58/04 34/242 |
| 3,938,813 | A | * | 2/1976 | Forch | F16J 15/3228 277/569 |
| 4,669,200 | A | * | 6/1987 | Carr | F16J 15/54 34/242 |
| 6,076,834 | A | * | 6/2000 | Jornhagen | B28B 21/563 277/604 |

(Continued)

FOREIGN PATENT DOCUMENTS

| CA | 905448 A | 7/1972 |
| EP | 2843121 A | 3/2015 |
| EP | 3130701 A | 2/2017 |

OTHER PUBLICATIONS

Italian Research Report for Italian appl'n No. IT 201800010346, Munich, completed Jul. 31, 2019.

*Primary Examiner* — Nicholas L Foster
(74) *Attorney, Agent, or Firm* — Abelman, Frayne & Schwab

(57) ABSTRACT

The invention relates to a seal for a clothes dryer adapted to be interposed between a first part and a second part of the dryer. The seal comprises a first portion adapted to be connected to the first part of the dryer and a second portion adapted to be placed in contact with the second part of the dryer. The second portion comprises an at least partially curved stretch and such an at least partially curved stretch comprises a flocked surface layer adapted to be placed in contact with said second part of the dryer.

18 Claims, 4 Drawing Sheets

(56) References Cited

U.S. PATENT DOCUMENTS

| | | | | |
|---|---|---|---|---|
| 6,675,496 B1* | 1/2004 | Moon | ............... | D06F 58/04 34/601 |
| 7,007,955 B2* | 3/2006 | Cross | ............... | D06F 58/04 277/652 |
| 9,562,610 B2* | 2/2017 | Lowe | ............... | F26B 25/008 |
| 10,113,646 B2* | 10/2018 | Lowe | ............... | F16J 15/16 |
| 10,215,286 B2* | 2/2019 | Allen | ............... | F16J 15/328 |
| 2005/0017459 A1* | 1/2005 | Cross | ............... | D06F 58/04 277/628 |
| 2006/0145430 A1* | 7/2006 | Cross | ............... | F16J 15/3288 277/652 |
| 2007/0044342 A1* | 3/2007 | Burns | ............... | D06F 58/04 34/242 |
| 2007/0074419 A1* | 4/2007 | Starrett | ............... | D06F 58/04 34/242 |
| 2013/0174435 A1* | 7/2013 | Rockwell | ............... | D04H 1/43 34/108 |
| 2013/0266787 A1* | 10/2013 | Rockwell | ............... | D04H 1/435 428/220 |
| 2013/0337205 A1* | 12/2013 | Rockwell | ............... | F26B 25/009 428/36.1 |
| 2014/0327212 A1* | 11/2014 | Lowe | ............... | F16J 15/065 277/345 |
| 2016/0257044 A1* | 9/2016 | Schramm | ............... | B29C 48/07 |
| 2017/0276250 A1* | 9/2017 | Lowe | ............... | D06F 58/04 |
| 2017/0284546 A1* | 10/2017 | Allen | ............... | F16J 15/324 |

\* cited by examiner

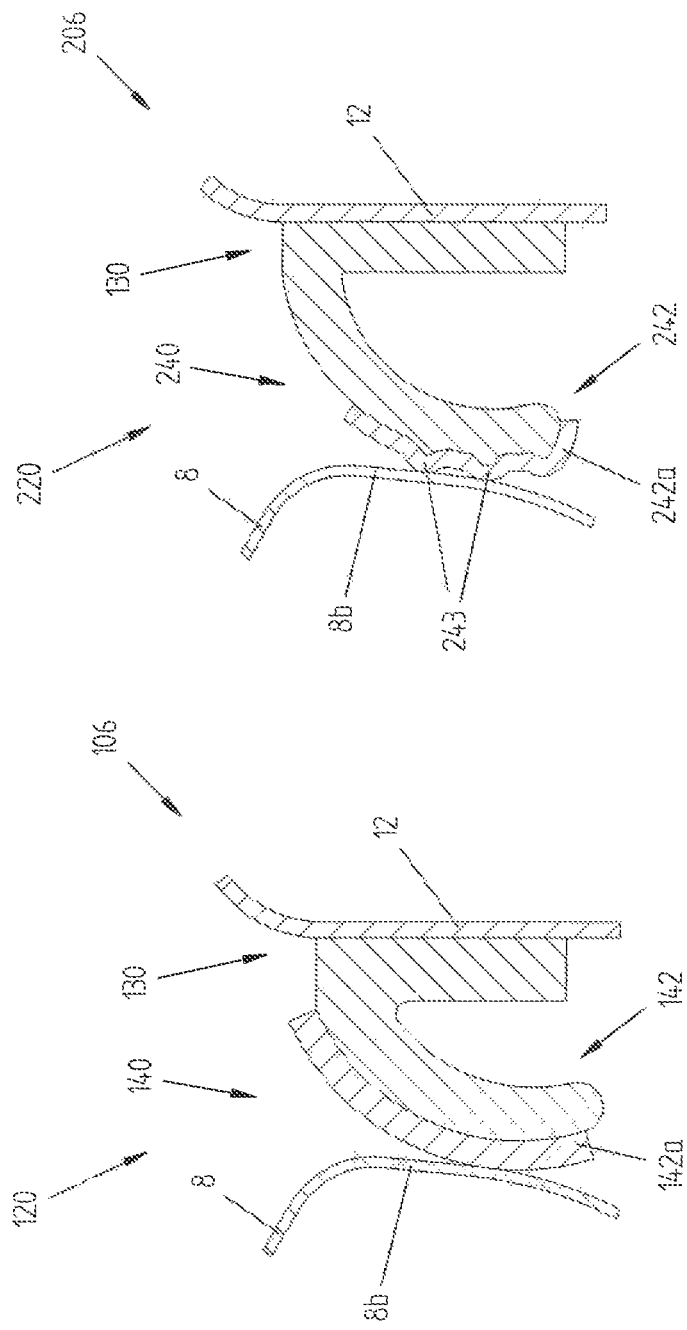

SEAL FOR A DRYER

FIELD OF THE INVENTION

The present invention belongs to the field of manufacturing seals used in clothes dryers. In particular, the present invention relates to a seal associated with the rotating basket to avoid losses of hot air out of the basket itself. More specifically, the present invention relates to a seal interposed between a fixed part and a movable part of the dryer.

BACKGROUND ART

In the field of manufacturing clothes dryers, hereinafter simply referred to as dryers, the use of hot air seals, which ensure the correct operation and/or the desired energy saving by avoiding losses of the hot air which is channeled to dry the clothing, is widely known.

Dryers of known type comprise a rotating basket, typically rotated alternately in both directions of rotation, inside which the clothes to be dried are placed.

The basket typically consists of a central cylindrical body, a front side and a rear side. The front side couples to an open front end of the central body and the rear side couples to the rear end of the central body. During operation, the central body is rotated, preferably by means of a belt system, while the front and rear sides remain stationary.

The front side is typically provided with an opening, which can be closed by means of a door, for the introduction/extraction of the clothes and the rear side is typically provided with one or more openings for the channeling of the hot drying air inside the basket.

According to the prior art, a first seal is interposed between the front end of the central body and the front side and a second seal is interposed between the rear end of the central body and the rear side.

The first seal preferably comprises a fixing surface to be fixed to the front stationary side and a sliding surface in contact with the front end of the central body. Similarly, the second seal preferably has a fixing surface to be fixed to the rear stationary side and a sliding surface in contact with the rear end of the central body.

The seals have the function of providing a sliding-type air seal, i.e. to ensure that the hot air does not escape from the basket while the basket is rotating.

Well-known seals are typically made from a vulcanized EPDM or PU rubber support, plus an additional layer of wear-resistant fabric fixed with various systems to the rubber support.

The fixing surface to be fixed to the stationary side (front or rear) is defined on the rubber support, while the fabric layer represents the sliding surface in contact with the end of the basket (front or rear).

The fabric layer usually has a flat shape and a high thickness (3-4 mm) and consists of strips of PET or Kevlar felt, depending on the performance of duration and working temperature required to the seal.

The felt strip is obtained from flat sheets and is applied in a flat area of the rubber support, typically by means of an adhesive or by stitching.

In all cases, the sealing systems of known type are affected by some drawbacks.

A first drawback of the known type of seals is related to the rapid reduction of the effectiveness of the seal over time. In order to ensure a good airtightness, the rubber support must be provided with a high preload in order to keep the flat felt in contact with the basket of the dryer. The preload tends to decrease naturally due to the relaxation of the rubber of which the support is made and thus the effectiveness of the seal tends to reduce over time.

Another drawback of the known type of seals is the high friction between the felt and the basket, which reduces the performance of the machine. This is particularly high in the early stages of machine operation as a result of the aforementioned high preload of the seal.

This also leads to an increase in energy consumption.

Another drawback of known seals is the reduction in the effectiveness of the seal over time due to the loss of adhesion between the rubber support and the felt at the interface area, e.g. loss of effectiveness of the adhesive or possible undoing of the stitching.

It is an object of the present invention to overcome the drawbacks of the prior art at least in part.

In particular, it is an object of the present invention to suggest a seal for dryers with a higher sealing efficiency than the systems of the known type.

It is another object of the present invention to suggest a seal for dryers which allows reducing the energy consumption compared to dryers of known type.

It is another object of the present invention to suggest a seal for dryers which allows reducing the maintenance and/or replacement of seals thus increasing the life and reliability of the seal.

It is a further object of the present invention to reduce the production costs of the seal compared to known type seals.

SUMMARY

The present invention is based on the general consideration of creating a seal with a flocked curved surface.

According to a first aspect, the present invention thus relates to a seal for a clothes dryer adapted to be interposed between a first part and a second part of said dryer, said seal comprising a first portion adapted to be connected to said first part of said dryer and a second portion adapted to be placed in contact with said second part of said dryer, wherein said second portion comprises an at least partially curved stretch and said at least partially curved stretch comprises a flocked surface layer adapted to be placed in contact with said second part of said dryer.

According to a preferred embodiment, the flocked surface layer comprises oriented fibers.

Preferably, the fibers comprise fibers from the group comprising: polyester fibers, polyamide fibers and aramid fibers.

According to a preferred embodiment of the invention, the fibers are electrostatically applied with the aid of an adhesive on said second portion.

According to a preferred embodiment, the first portion and the second portion of said seal are made in one piece, preferably by means of an extrusion process or by means of an injection molding process.

According to a preferred embodiment, the first portion and the second portion define a closed structure.

According to another preferred embodiment, the first portion and the second portion define an open structure, wherein the second portion comprises a portion which overhangs from the first portion.

Preferably, the portion which overhangs from the first portion is at least partially curved.

According to a preferred embodiment, the seal comprises connecting means for connecting the first portion to the first part of the dryer.

Preferably, the connecting means comprise mechanical interference means.

In a preferred embodiment, the seal has a toroidal shape.

In a second aspect, the present invention relates to a clothes dryer comprising a seal adapted to be interposed between a first part and a second part of said dryer, in which the seal is provided as described above.

In a preferred embodiment, either the first part of the dryer is a stationary part and the second part of the dryer is a movable part relative to the first part or the second part of the dryer is a stationary part and the first part of the dryer is a movable part with respect to the second part.

Preferably, the movable part comprises an end of a central body of a rotating basket of the dryer.

Preferably, the stationary part comprises a side associated with the end of said central body of the basket.

In a third aspect, the present invention relates to the use of a seal in a clothes dryer, said dryer comprising a first part and a second part, where the seal is provided as described above.

Preferably, the seal is used either in a dryer in which the first part is a stationary part and the second part is a movable part with respect to the first part or in a dryer in which the second part of the dryer is a stationary part and the first part of the dryer is a movable part with respect to the second part.

BRIEF DESCRIPTION OF THE DRAWINGS

In order to better understand the features and advantages of the present invention, non-limiting examples of practical embodiments are described below with reference to the accompanying drawings, in which:

FIG. 6 shows a variant of FIG. 5;

FIG. 7 shows another variant of FIG. 5.

DETAILED DESCRIPTION OF THE INVENTION

Figure 1:
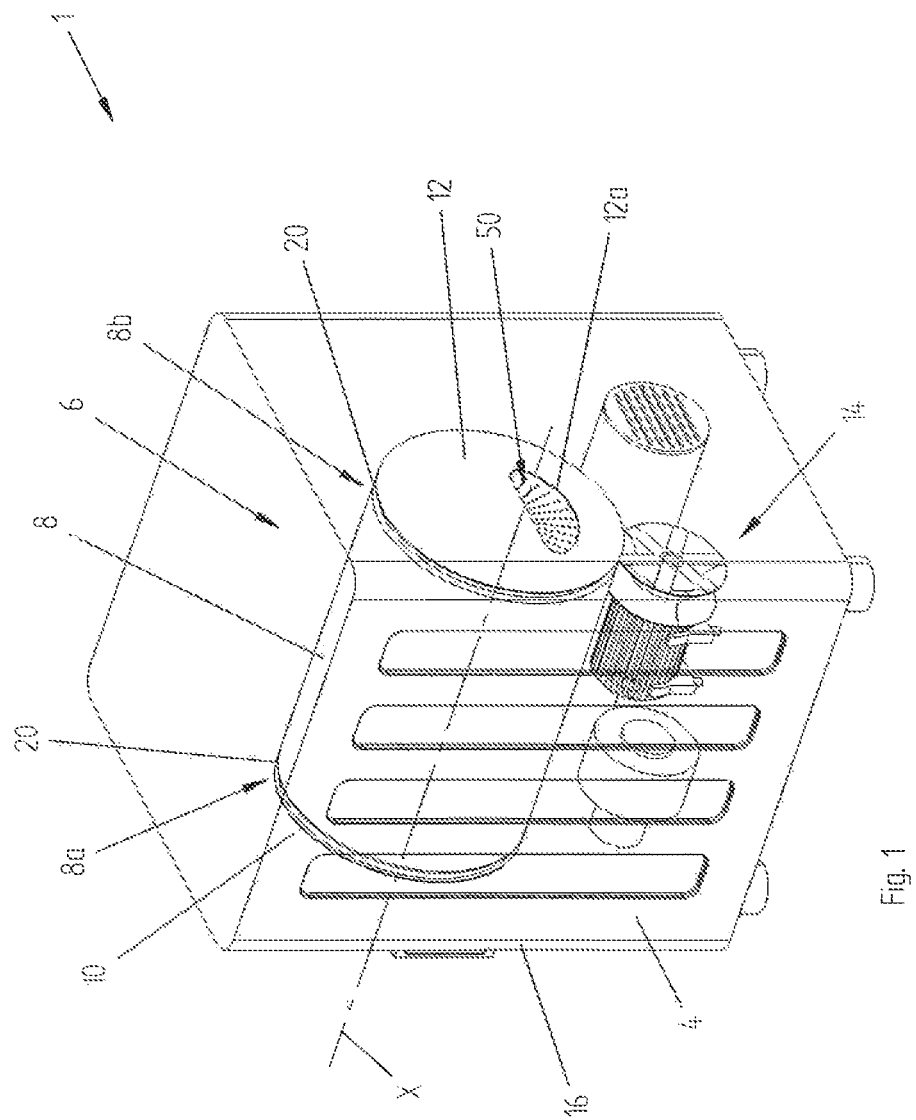
FIG. 1 shows an axonometric view of a dryer comprises a seal according to a preferred embodiment of the present invention.
Figure 2:
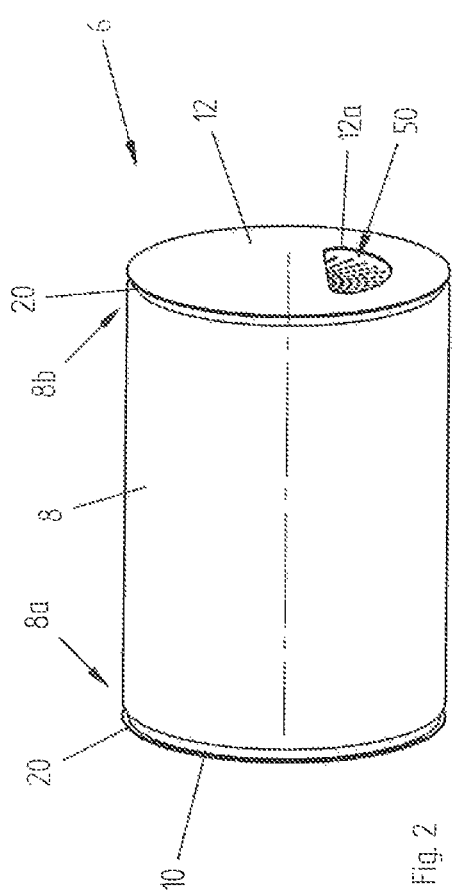
FIG. 2 shows an axonometric view of some elements of the dryer in FIG. 1 isolated from the rest.
Figure 3:
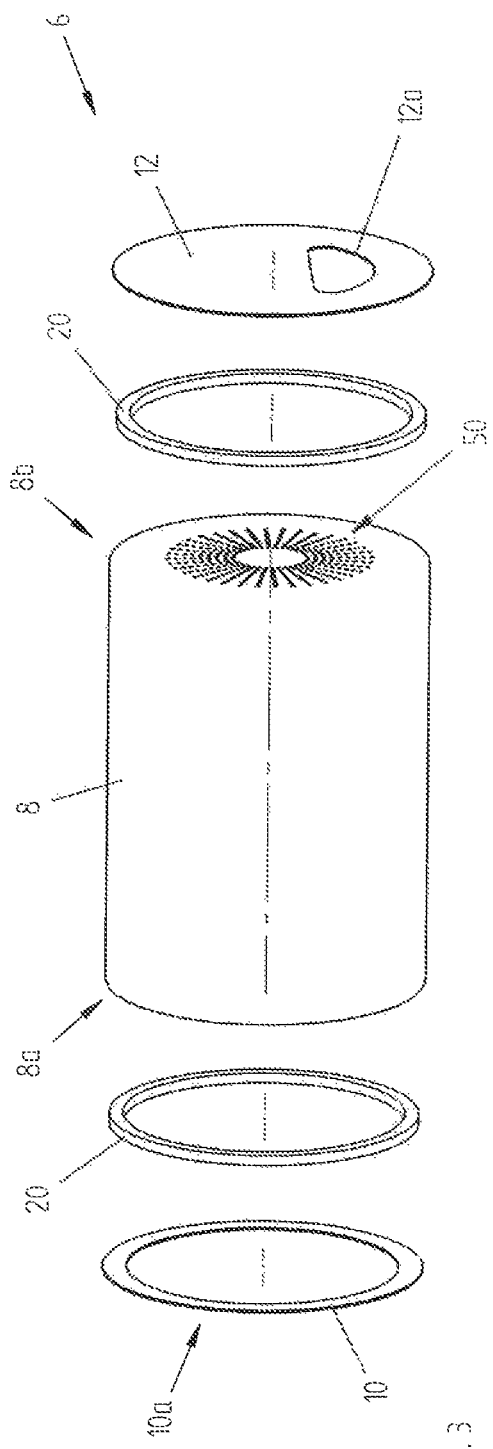
FIG. 3 shows an exploded view of FIG. 2.

Although the present invention is described below with reference to the embodiments shown in the drawings, the present invention is not limited to the embodiments described hereinafter and shown in the drawings. On the contrary, the embodiments described and depicted clarify some aspects of the present invention.

The present invention has proved to be particularly advantageous with reference to the manufacturing of a seal for a clothes dryer basket, as better disclosed below.

It is worth noting that the present invention is not limited to the manufacturing of a seal for a dryer basket. On the contrary, the present invention is conveniently applied to all the cases which provide the use of a seal adapted to be interposed between two parts of a dryer, wherein one part is stationary, and a second part is movable with respect to such a first part.

FIG. 1 shows a dryer 1 comprising a seal 20 according to a preferred embodiment of the present invention.

The dryer 1 according to the preferred embodiment shown in the figure is exclusively used to dry clothes placed inside it. The dryer 1 preferably comprises an outer supporting structure 4, preferably parallelepiped-shaped, and a rotating clothing treatment chamber 6, or basket.

The basket 6 can preferably be rotated about a horizontal axis X. In some variants, the basket may rotate about a vertical or inclined axis.

In operation, the basket 6 is typically rotated alternately in the two directions, clockwise and counterclockwise.

The basket 6 preferably comprises a central body 8, a front side 10 and a rear side 12. The central body 8 is preferably cylindrical and the front side 10 and rear side 12 are circular.

The front side 10 is coupled to the front end 8a of the central body 8 and the rear side 12 is coupled to the rear end 8b of the central body 8.

Preferably, the front end 8a of the central body 8 is open and the rear end 8b is closed.

During operation, the central body 8 is rotated, preferably by means of a belt system 14. The front side 10 and the rear side 12 remain stationary, instead.

The front side 10 preferably comprises an opening 10a, which can be closed by means of a door 16, for the introduction/extraction of the clothes into/from the basket 6.

The rear side 12 preferably comprises an opening 12a for channeling the hot drying air from/into the basket 6 which passes through a plurality of holes 50 obtained in the rear end 8b of the central body 8.

The basket 6 preferably comprises a first seal 20 interposed between the front end 8a of the central body 8 and the front side 10 and a second seal 20 interposed between the rear end 8b of the central body 8 and the rear side 12.

The seals 20 preferably have a toroidal shape in order to mimic the circular geometric shapes of the ends 8a, 8b of the central body 8 and of the front and rear sides 10, 12.

The first and second seals 20 are preferably the same and are mounted in a specular manner on the basket 6.

However, in some variants, the first and second seals may also differ geometrically from each other so that the first seal is better adapted to the actual shapes of the front end of the central body and the front and second seals are better adapted to the actual shapes of the rear end of the central body and the rear side. Regardless of their design, the two seals have the same functional principle.

For said reasons, the two seals hereafter in the following description will be identified by the same reference numeral 20 and only one seal will be described in detail, in particular the rear one. The description of the rear seal will therefore also be representative of the front seal.

Figure 5:
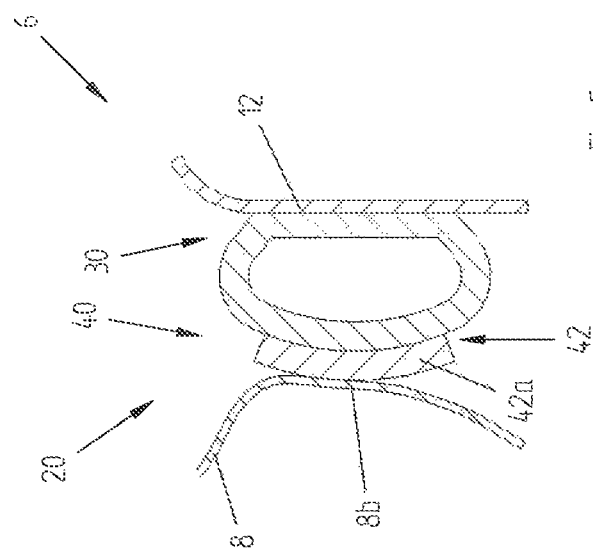
FIG. 5 shows an enlarged detail of FIG. 4.
Figure 4:
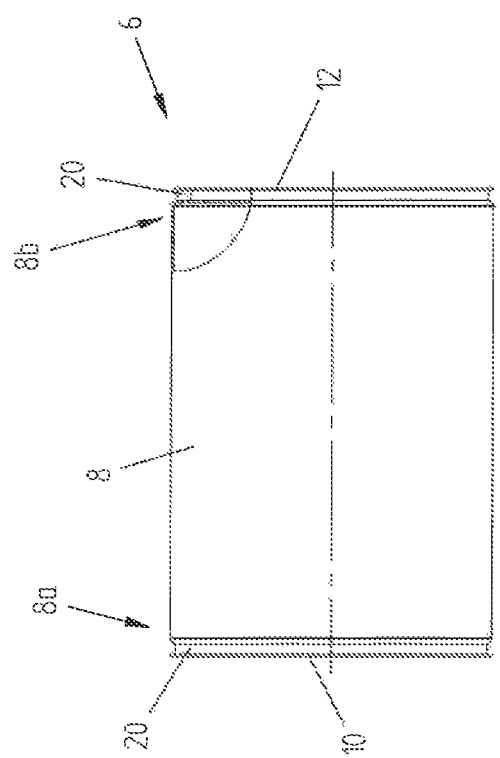
FIG. 4 shows a partially sectioned side view of FIG. 2.

The seal 20 preferably comprises a first portion 30 adapted to be connected to the stationary rear side 12 of the basket 6 and a second portion 40 to be put into contact with the rear end 8b of the rotatable central body 8, as better shown in FIG. 5.

According to the embodiment shown in FIG. 5, the first portion 30 and the second portion 40 are shaped so as to define a closed structure.

Preferably, the first portion 30 and the second portion 40 are made in one piece, preferably by means of an extrusion process.

In some variants, equivalent alternative implementation processes may be used.

According to an aspect of the present invention, the second portion 40 preferably comprises a stretch 42 which is at least partially curved.

According to a further aspect of the present invention, such a stretch 42 comprises a flocked surface layer 42a. The flocked surface layer 42a is arranged on the curved stretch 42 of the second portion 40 so as to be in contact with the rear end 8b of the rotatable central body 8 when the seal 20 is mounted on the basket 6.

Preferably, the flock layer 42a comprises a plurality of oriented fibers.

According to a preferred construction method of the seal 20, the fibers are preferably applied electrostatically and with the aid of an adhesive on the support base consisting of the second portion 40.

Preferably, the fibers are applied directly onto the second portion 40 previously obtained by an extrusion process or by means of an injection molding process. Such steps of manufacturing may be performed advantageously in an in-line production process, in particular in the case of an extrusion process, thus reducing manufacturing costs with respect to the known systems, e.g. such as in the known solutions in which a felt application process is required.

The fibers in the flocked layer 42a are preferably oriented perpendicularly to the support base 40.

Polyester fibers, polyamide fibers and aramid fibers are preferably used.

The technology for forming the flocked layer 42a on the second portion 40 allows increasing the mutual seal between the flocked layer 42a and the second portion 40 over time. This allows increasing the service life of the component and either reduces or avoids any maintenance and/or replacement of the seal.

This also reduces the energy consumption of dryer 1 during operation.

Furthermore, the technology for forming the flocked layer 42a on the second portion 40 allows freeing the choice of the geometry of the seal 20 from the need to have flat portions for the connection of flat felt, according to the prior art. Therefore, the first and/or second portion 30, 40 of the seal can be made with appropriate geometries which can compensate for the failure of the seal over time.

In another advantageous aspect, already mentioned, the second portion 40 preferably comprises an at least partially curved stretch 42, more preferably shaped as an arc of circumference.

Advantageously, the curvature of the flocked surface layer 42a conferred by the curved line 42 allows reducing the contact surface, and thus reducing the friction between the seal 20 and the rear end 8b of the rotatable central body 8, in particular with respect to solutions with felt in which the contact surface of the felt itself is flat and therefore with a corresponding greater contact surface.

The reduction of the contact surface further and advantageously allows reducing energy consumption.

Still advantageously, the curvature of the flocked surface layer 42a conferred by the curved stretch 42 allows increasing the contact pressure of the seal 20 against the rear end 8b of the rotatable central body 8, thus increasing the sealing performance of the seal 20 itself.

In a preferred embodiment, the seal 20 is connected to the stationary rear side 12 of the basket 6 by mechanical interference, more preferably by mechanical interlocking.

Different means of connection may be used in some variants, such as rivets, plastic pincers, screws, heat-sealing, gluing, etc.

In the embodiment disclosed and described above, the first portion 30 of the seal is connected to the stationary rear side 12 of the basket 6 and the second portion 40 is placed in contact with the rear end 8b of the rotatable central body 8. In a preferred variant, the seal can be positioned in the opposite direction, i.e. with the first portion connected to the rear end of the rotatable central body of the basket and with the second portion in contact with the stationary rear side.

With reference to FIG. 6, an initial design variant of the shape of the seal 120 according to the present invention is described below.

Features and/or component parts corresponding to or equivalent to those of the previous embodiment are identified by the same reference numerals.

The seal 120 preferably comprises a first portion 130 adapted to be connected to the stationary rear side 12 of the basket 106 and a second portion 140 adapted to be put into contact with the rear end 8b of the rotatable central body 8 of the basket 106.

The first portion 130 and the second portion 140 are shaped so as to define an open structure in which the second portion 140 comprises a portion which overhangs from the first portion 130.

Preferably, the first portion 130 and the second portion 140 are made in one piece, preferably by an extrusion process or by means of an injection molding process.

The second portion 140 preferably comprises a stretch 142 which is at least partially curved. Such a stretch 142 comprises a flocked surface layer 142a. The flocked surface layer 142a is arranged on the curved stretch 142 of the second portion 140 so as to be in contact with the rear end 8b of the rotatable central body 8 when the seal 120 is mounted on the basket 106.

Preferably, the flocked layer 142a comprises a plurality of fibers oriented as described above with reference to the first embodiment.

The curved stretch 142 preferably comprises an arc of circumference.

Preferably, the seal 120 is connected to the stationary rear side 12 of the basket 106 by mechanical interference, more preferably by mechanical interlocking.

Such an embodiment allows achieving the objects and/or advantages previously described with reference to the first embodiment.

Another variant of the seal 220 according to the invention is described with reference to FIG. 7.

Features and/or component parts corresponding to or equivalent to those of the previous embodiment depicted in FIG. 6 are identified by the same reference numerals.

Such an embodiment differs from the embodiment previously described with reference to FIG. 6 in that the curved stretch 242 of the second portion 240 of the seal 220 is provided with ribs 243.

Preferably, such ribs 243 develop continuously and concentrically one to the other on the circular surface of the curved stretch 242.

Advantageously, the presence of ribs 243 further reduces the sliding contact points between the stationary part (rear side 12) and the movable part (rear end 8b of the central body 8) of the basket 206.

Still advantageously, the presence of ribs 243, preferably concentric, ensures greater sealing certainty by determining multiple sealing areas in succession, i.e. concentric, between the seal 20 and the movable part (rear end 8b of the central body 8) of the basket 206.

Such an embodiment allows achieving the objects and/or advantages previously described with reference to the first embodiment.

It has therefore been demonstrated by means of the above description that the seal according to the present invention allows to achieve the predetermined objects. In particular, the seal according to the present invention allows obtaining a higher sealing than the systems of known type.

Although the present invention is explained above by means of the detailed description of some embodiments shown in the drawings, the present invention is not limited to the embodiments described above and shown in the drawings; on the contrary, further variants of the described embodiments fall within the scope of the present invention as defined by the claims.

The invention claimed is:

1. A seal for a clothes dryer adapted to be interposed between a first part and a second part of said dryer, said seal comprising:
a first portion configured for connection to said first part of said dryer and a second portion configured to be placed in contact with said second part of said dryer, wherein said second portion comprises an at least partially curved stretch, said at least partially curved stretch including a flocked surface layer adapted to be placed in contact with said second part of said dryer, said flocked surface layer including fibers orientated perpendicular to said second portion, wherein said fibers are electrostatically applied with an adhesive on said second portion.

2. The seal according to claim 1, wherein said fibers comprise fibers of the group comprising: polyester fibers, polyamide fibers and aramid fibers.

3. The seal according to claim 1, wherein said first portion and said second portion of said seal are made in one piece.

4. The seal according to claim 1, wherein said first portion and said second portion define a closed structure.

5. The seal according to claim 3, wherein said first portion and said second portion define an open structure, wherein said second portion comprises a portion which extends from said first portion.

6. The seal according to claim 5, wherein said portion which extends from said first portion is at least partially curved.

7. The seal according to claim 1, further comprising a connector for connecting said first portion to said first part of said dryer.

8. The seal according to claim 7, wherein said connector includes a mechanical interference.

9. The seal according to claim 1, wherein it is toroidal.

10. The seal according to claim 3, wherein said first portion and said second portion of said seal are made in one piece by an extrusion process.

11. The seal according to claim 3, wherein said first portion and said second portion of said seal are made in one piece by an injection molding process.

12. A clothes dryer comprising the seal of claim 1 interposed between a first part and a second part of said dryer.

13. The dryer according to claim 12, wherein said first part of said dryer is a stationary part and said second part of said dryer is a movable part relative to said first part or, said second part of said dryer is a stationary part and said first part of said dryer is a movable part with respect to said second part.

14. The dryer according to claim 13, characterized in that said movable part comprises an end of a central body of a rotating basket of said dryer.

15. The dryer according to claim 14, wherein said stationary part comprises a side associated with said end of said central body of said basket.

16. A use of a seal in a clothes dryer, wherein said seal is the seal according to claim 1.

17. The use according to claim 16, wherein said first part of said dryer is a stationary part and said second part of said dryer is a movable part relative to said first part.

18. The use according to claim 16, wherein said second part of said dryer is a stationary part and said first part of said dryer is a movable part with respect to said second part.

* * * * *